United States Patent
Cheethirala et al.

(10) Patent No.: US 7,647,434 B2
(45) Date of Patent: Jan. 12, 2010

(54) TECHNIQUE FOR IN ORDER DELIVERY OF TRAFFIC ACROSS A STORAGE AREA NETWORK

(75) Inventors: Madhava Rao Cheethirala, San Jose, CA (US); Raja Rao Tadimeti, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 754 days.

(21) Appl. No.: 11/134,742

(22) Filed: May 19, 2005

(65) Prior Publication Data

US 2006/0262784 A1    Nov. 23, 2006

(51) Int. Cl.
G06F 3/00 (2006.01)
G06F 13/00 (2006.01)
G06F 15/173 (2006.01)

(52) U.S. Cl. .................. 710/29; 710/30; 710/36; 711/100; 709/238

(58) Field of Classification Search .......... None
See application file for complete search history.

(56) References Cited

U.S. PATENT DOCUMENTS

| | | | |
|---|---|---|---|
| 6,754,751 B1 * | 6/2004 | Willke | 710/112 |
| 6,819,654 B2 | 11/2004 | Soloway et al. | |
| 7,506,074 B2 | 3/2009 | Venkatanarayan et al. | |
| 2002/0154645 A1 | 10/2002 | Hu et al. | |
| 2003/0065944 A1 | 4/2003 | Mao et al. | |
| 2005/0018673 A1 | 1/2005 | Dropps et al. | |
| 2005/0047334 A1 | 3/2005 | Paul et al. | |
| 2005/0053073 A1 | 3/2005 | Kloth et al. | |
| 2005/0281196 A1 | 12/2005 | Tornetta et al. | |
| 2006/0023725 A1 | 2/2006 | Makishima et al. | |
| 2006/0245361 A1 | 11/2006 | Cheethirala et al. | |
| 2008/0159171 A1 | 7/2008 | Banks et al. | |

OTHER PUBLICATIONS

Information Technology Industry Council, Fibre Channel Switch Fabric-3 (FC-SW-3) Rev. 6.6, Dec. 19, 2003.
Information Technology Industry Council, Fibre Channel-Generic Services-4 (FC-GS-4) Rev 7.8, Jan. 12, 2004.
International Search Report and Written Opinion dated Oct. 10, 2007 from PCT/US06/16038; 7 pgs.
US Office Action dated Sep. 11, 2008 from U.S. Appl. No. 11/116,604 12 pgs.
US Final Office Action dated Apr. 22, 2009 from U.S. Appl. No. 11/116,604; 12 pgs.

* cited by examiner

*Primary Examiner*—Alan Chen
(74) *Attorney, Agent, or Firm*—Weaver Austin Villeneuve & Sampson LLP

(57) ABSTRACT

A technique is disclosed for managing in-order-delivery of data traffic in a storage area network which includes at least one host device adapted to communicate with at least one storage device via a fiber channel fabric. When a change in at least one route in the fiber channel fabric is detected, a first zone, flow and/or device in the network which is affected by the route change is identified, and frames associated with the first zone/flow/device are temporarily dropped for a temporary time period T. In one embodiment, the first zone/flow/device includes at least one device which is sensitive to the order in which data traffic is received. According to a specific implementation, a second zone/flow/device in the network which is affected by the route change, and which is not sensitive to the order in which data traffic is received may also be identified, and frames associated with the second zone/flow/device forwarded to their destination address during the temporary time period T.

26 Claims, 7 Drawing Sheets

Fig. 8

| Zone ID (802) | Members (804) | Actions (806) |
|---|---|---|
| A | H1, D1 | Drop |
| B | H2, D2 | Forward |
| C | H1, D1, D2 | Drop |
| ⋮ | ⋮ | ⋮ |

801 → row A; 803 → row C; 800

Fig. 9

| Flow ID (902) | Members (904) | Action (906) |
|---|---|---|
| SID1-DID1 | H1, D1 | Drop |
| SID2-DID1 | H2, D1 | Drop |
| SID1-DID2 | H1, D2 | Forward |
| SID2-DID2 | H2, D2 | Forward |

901 → SID1-DID1; 903 → SID2-DID1; 900

Fig. 10

| DID (1002) | Action (1004) |
|---|---|
| DID1 | Drop |
| DID2 | Forward |
| | |
| | |
| | |

1001 → DID1; 1000

| Zone ID | Members | Attributes |
|---------|---------|------------|
| A | H1, D1 | IOD on |
| B | H2, D2 | IOD off |
| C | H1, D1, D2 | IOD on |
| ⋮ | ⋮ | ⋮ |

Fig. 11

TECHNIQUE FOR IN ORDER DELIVERY OF TRAFFIC ACROSS A STORAGE AREA NETWORK

RELATED APPLICATION DATA

This application is related to U.S. patent application Ser. No. 11/116,604 entitled "IMPROVED LOAD BALANCING TECHNIQUE IMPLEMENTED IN A STORAGE AREA NETWORK," by Cheethirala et al., filed on Apr. 27, 2005, which is incorporated herein by reference in its entirety and for all purposes.

BACKGROUND OF THE INVENTION

1. Field of the Invention

The present invention relates to storage area networks, and more particularly, to an apparatus and method for an improved technique for implementing in order delivery of traffic across a storage area network.

2. Background of the Invention

With the increasing popularity of Internet commerce and network centric computing, businesses and other organizations are becoming more and more reliant on information. To handle all of this data, storage area networks or SANs have become very popular. A SAN typically includes a number of storage devices, a plurality of Hosts, and a number of Switches arranged in a Switching Fabric that connects the storage devices and the Hosts.

Most SANs rely on the Fibre Channel protocol for communication within the Fabric. For a detailed explanation of the Fibre Channel protocol and Fibre Channel Switching Fabrics and Services, see the following publications: ANSI INCITS 373-2003, Fibre Channel Framing and Signaling Interface (FC-FS); ANSI INCITS 384-2004, Fibre Channel-Switch Fabric-3 (FC-SW-3); and ANSI INCITS 387-2004, Fibre Channel-Generic Services-4 (FC-GS-4); all of which are incorporated herein by reference for all purposes.

In conventional Fibre Channel, each device (e.g., hosts, storage devices and switches) is identified by an unique eight (8) byte wide Node_Name assigned by the manufacturer. When the Fibre Channel devices are interconnected to form a SAN, the Node_Name (along with other parameters) is used to identify each device. Fibre Channel frames are used for communication among the devices in the SAN. The Node_Name, however, is not used by the frames. Instead the Fibre Channel Port of each end device (hosts and storage devices) is addressed via a three (3) byte Fibre Channel address (or FCID), allocated dynamically to the end devices by the fabric. A unique FCID is assigned to a host device or disk device when the device logs in to the fabric. Additionally, each switch in the fabric is assigned a specific domain by the domain manager when the switch is connected to the fabric. All the devices connected to a given switch will have the DomainID of the switch as the first byte of their FCIDs. This "Domain" value is used for routing the frames within the fabric. Each FC frame header will include an SID field representing the source FCID, and a DID field representing the destination FCID.

Fibre Channel based SANs are often organized into zones. Within each zone, Hosts can see and access only storage devices or other Hosts belonging to that zone. This allows the coexistence on the same SAN of different computing environments. Additionally, zoning allows the partition of a Fibre Channel fabric into smaller fabrics to allow the implementation of features such as security and restrictions. Devices belonging to a single functional group are typically placed under the same zone. For example, devices involved in online transactions can be placed in one zone while devices associated with backing up user data can be placed in another zone. The SAN administrator may define in a SAN multiple zones, as required or dictated by the computing and storage resources connected to it. The Switching Fabric allows communications only between devices belonging to the same zone, preventing a device of one zone from seeing or accessing a device of another zone.

Recently, new technology referred to as Virtual SANs or VSANs have been implemented in order to enhance fabric scalability and availability, and further augment the security services offered by fabric zoning. VSANs combined with hardware-enforced zoning provide the SAN designer with new tools to highly optimize SAN deployments in terms of scalability, availability, security and management. VSANs provide the ability to create completely isolated fabric topologies, each with its own set of fabric services, on top of a scalable common physical infrastructure. As each VSAN possesses its own zoning service, zoning is then configured within each VSAN independently and has no affect on any other VSAN and zoning service.

FIG. 1 shows a block diagram of a portion 100 of a Fibre Channel network. As illustrated in the example of FIG. 1, the Fibre Channel network includes a plurality of hosts (H1, H2), a plurality of discs or storage devices (D1, D2), and a VSAN fabric 104 which includes a plurality of switches (SW1-SW5) such as, for example, switches from the MDS line of storage switches available from Cisco Systems of San Jose, Calif. A flow between any two Fibre Channel (FC) devices may be characterized by the respective identities (e.g. FCIDs) of each device. For example, the flow H1-D1 may correspond to an exchange of frames between host H1 and storage device D1. Typically, in FC networks, a given flow is expressed in terms of the SID and DID parameters (e.g., SID-DID) associated with the frames of that flow.

Typically, each flow in the Fibre Channel network includes at least one exchange of one or more sequences of frames transmitted from one port to another. Each Fibre Channel sequence may represent a series of one or more related frames transmitted unidirectionally from one port to another. A Fibre Channel exchange represents a series or one or more nonconcurrent sequences between two ports. The sequences may be in either direction. As another perspective, one can use the following analogy to characterize the hierarchy of frames, sequences, exchanges, and flows in a Fibre Channel network: frames correspond to words, sequences correspond to sentences, and exchanges correspond to conversations, and a flow may be characterized as any communication between a given source device and a given destination device. A Fibre Channel (FC) device may be configured or designed to "speak" more than one sentence and hold more than one "conversation" at a time with another FC device.

Generally, in Fibre Channel networks, it is possible for frames generated by a particular source to reach their destination out of order. This may occur, for example, due to events such as load balancing, route changes, QoS policy changes, etc. However, some Fibre Channel protocols, applications and/or devices (such as, for example, tape backup devices, Fibre Channel write acceleration protocols, etc.) are sensitive to the order in which frames are delivered, and cannot handle out-of-order frame delivery. Accordingly, most conventional SANs or Fibre Channel networks are provided with in-order-delivery (IOD) or in-order-delivery (IOD) mechanisms by which data frames are guaranteed to be delivered to a destination in the same order that the frames were sent by the source/originator. For example, many Cisco MDS switches are configured or designed to support IOD across one or more VSANs. However, because conventional IOD mechanisms guarantee in-order frame delivery, frames in the FC fabric which can not be delivered in-order by the FC fabric are typically dropped for brief period of time.

For example, referring to FIG. 1, it is assumed, for purposes of illustration, that disk D1 is sensitive to the order in which frames are received, and that disk D2 is not sensitive to the order in which frames are received. Additionally, it is assumed in this example that disks D1 and D2 are members of the same destination domain associated with switch SW4. During normal operation, a load balancing mechanism implemented in the FC fabric 104 may result in frames sent, for example, from Host H1 to disk D1 traveling via different paths (for example, via either link 105 or link 103) to arrive at their final destination D1. However, in conventional storage area networks, if a route change or route failure is detected on at least one of the paths to a specific destination domain which includes at least one device that is known to be sensitive to frame delivery order, the FC fabric may respond by temporarily dropping all frames to that destination domain in order to reduce the possibility of out-of-order frames being delivered to the order-sensitive device. Thus, for example, if it is detected that link 105 has gone down, the FC fabric 104 may respond by temporarily dropping all frames to the destination domain associated with switch SW4 in order to reduce the possibility of out-of-order frames being delivered to disk D1.

One problem with such a technique, however, is that the temporary dropping of all frames to the identified destination domain may also result in the unnecessary dropping of frames which are traveling to other non-order sensitive devices in the same destination domain. For example, because disk D2 is a member of the same destination domain as that of disc D1, frames which are intended to be delivered to disk D2 will also be temporarily dropped in response to the detection of a route failure (or route change) at link 105, even though disk D2 is not sensitive to the order in which frames are received. Thus it can be seen and that some devices are unnecessarily penalized by conventional mechanisms implemented to provide in-order guarantee of frame delivery.

Additionally, according to conventional techniques, in order to implement an IOD mechanism across the FC fabric of a SAN or VSAN, each switch in the FC fabric needs to be individually configured with the same IOD parameters. Since there are conventionally no standard protocols by which the IOD configurations are able to be automatically propagated across the FC fabric, configuration or reconfiguration of IOD configuration parameters across the FC fabric is typically a burdensome and resource intensive task.

Accordingly, it will be appreciated that there exists a need for improving in-order-delivery of traffic across a storage area network.

SUMMARY OF THE INVENTION

Various aspects of the present invention are directed to different methods, systems, and computer program products for managing in-order-delivery of data traffic in a storage area network which includes at least one host device adapted to communicate with at least one storage device via a fibre channel fabric. In at least one implementation, the fibre channel fabric includes at least one switch. When a change in at least one route in the fibre channel fabric is detected, a first zone in the network which is affected by the route change is identified, and frames associated with the first zone are temporarily dropped for a temporary time period T. In one embodiment, the first zone includes at least one device which is sensitive to the order in which data traffic is received. According to a specific implementation, a second zone in the network which is affected by the route change may also be identified, and frames associated with the second zone are forwarded to their destination address during the temporary time period T. In one implementation, the second zone may include a second device which is not sensitive to an order in which data traffic is received. Additionally, the first and second devices may each be associated with the same destination domain.

Other aspects of the present invention are directed to different methods, systems, and computer program products for managing in-order-delivery of data traffic in a storage area network which includes at least one host device adapted to communicate with at least one storage device via a fibre channel fabric. When a change in at least one route in the fibre channel fabric is detected, a first flow in the network which is affected by the route change is identified, and frames associated with the first flow are temporarily dropped for a temporary time period T. In one embodiment, the first flow includes at least one device which is sensitive to the order in which data traffic is received. According to a specific implementation, a second flow in the network which is affected by the route change may also be identified, and frames associated with the second flow are forwarded to their destination address during the temporary time period T. In one implementation, the second flow may include a second device which is not sensitive to an order in which data traffic is received. Additionally, the first and second devices may each be associated with the same destination domain.

Additional aspects of the present invention are directed to different methods, systems, and computer program products for managing in-order-delivery of data traffic in a storage area network which includes at least one host device adapted to communicate with at least one storage device via a fibre channel fabric. When a change in at least one route in the fibre channel fabric is detected, a first device in the network may be identified. In one implementation, the first device is affected by the route change and is sensitive to the order in which frames are delivered. Frames associated with the first device may then be temporarily dropped for a temporary time period T. According to a specific implementation, a second device in the network which is affected by the route change may also be identified, and frames associated with the second device are forwarded to their destination address during the temporary time period T. In one implementation, the second device is not sensitive to the order in which frames are delivered. Additionally, the first and second devices may each be associated with the same destination domain.

Additional objects, features and advantages of the various aspects of the present invention will become apparent from the following description of its preferred embodiments, which description should be taken in conjunction with the accompanying drawings.

BRIEF DESCRIPTION OF THE DRAWINGS

FIGS. 8-10 illustrate various types of information which may be stored in different access control/forwarding tables, according to different embodiments of the present invention.

FIG. 11 shows a representation of a portion of a data structure 1100 (herein referred to as a Zone Attribute Table) which may be used for facilitating the zone-based in-order delivery technique of the present invention.

DETAILED DESCRIPTION OF THE PREFERRED EMBODIMENTS

The present invention describes various techniques for improving in-order-delivery traffic mechanisms across a storage area network In one implementation, zoning information may be used to classify data traffic in order to provide in-order-delivery for selected data traffic associated with zones that include devices known to be sensitive to frame delivery order. In another implementation, flow information may be used to classify data traffic in order to provide in-order-delivery for selected data traffic associated with flows that include devices known to be sensitive to frame delivery order. In yet another implementation, device identity information (e.g., DID, SID, etc,) may be used to classify data traffic in order to provide in-order-delivery for selected data traffic associated with the devices known to be sensitive to frame delivery order. Thus it will be appreciated that the various techniques of the present invention provide mechanisms which may be used to achieve improved granularity with respect to SAN or VSAN in-order-delivery (IOD) or in-order-delivery (IOD) configurations. For purposes of simplification and clarity, the terms "in-order-delivery" (IOD) and "in-order-guarantee" (IOG) may be used synonymously in this application.

Figure 2:
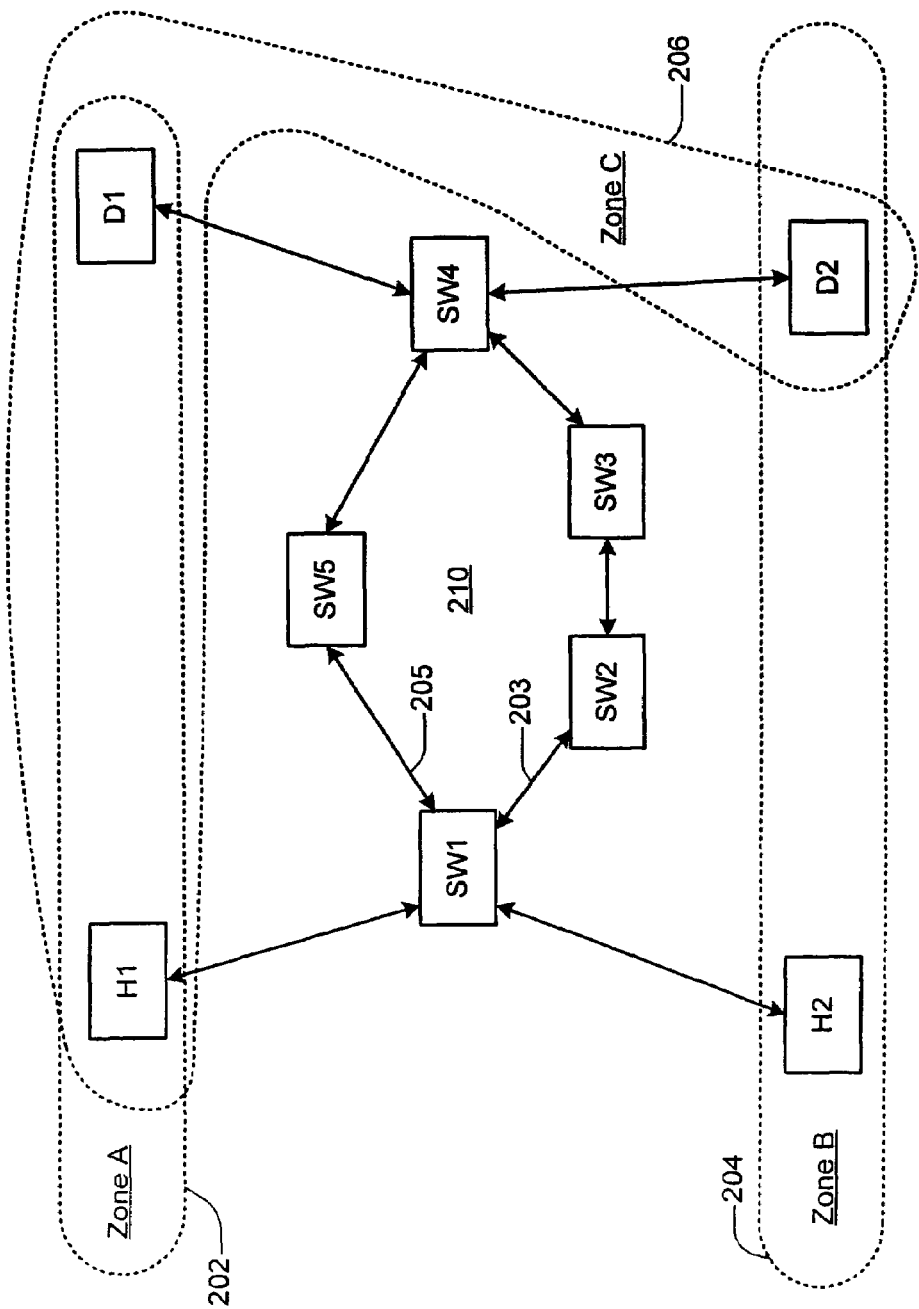
FIG. 2 shows a block diagram of a specific embodiment of a storage area network portion 200, which may be used for illustrating various aspects of the present invention.

FIG. 2 shows a block diagram of a specific embodiment of a storage area network portion 200, which may be used for illustrating various aspects of the present invention. In the example of FIG. 2, the storage area network 200 has been organized into a plurality of different zones. Zone A 202 includes members H1 and D1; Zone B 204 includes members H2 and D2; and Zone C 206 includes members H1, D1, and D2. For purposes of illustration it is assumed that disk D1 is sensitive to the order in which frames are received, and that disk D2 is not sensitive to the order in which frames are received. Additionally, it is assumed in this example that disks D1 and D2 are members of the same destination domain associated with switch SW4. The storage area network of FIG. 2 represents a simplified model which may be used for purposes of illustrating various aspects of the present invention. However, it will be appreciated that the techniques of the present invention as described herein may be implemented in a variety of other network configurations generally known to one having ordinary skill in the art.

Figure 3:
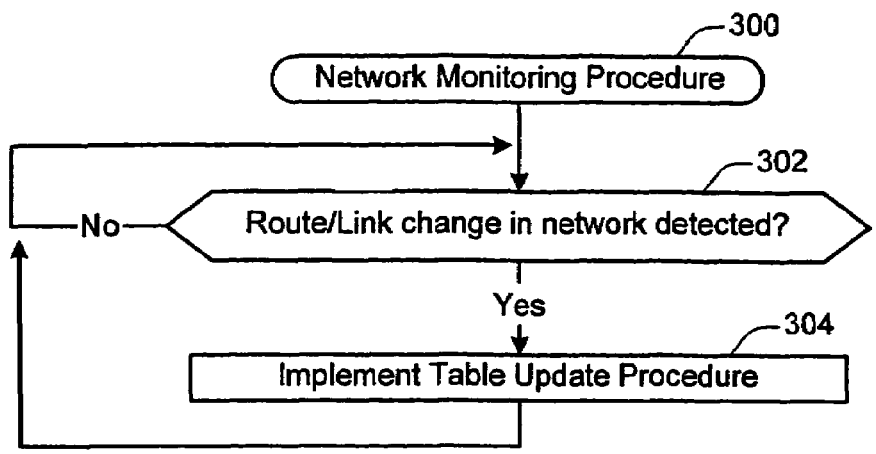
FIG. 3 shows a flow diagram of a Network Monitoring Procedure 300 in accordance with a specific embodiment of the present invention.

FIG. 3 shows a flow diagram of a Network Monitoring Procedure 300 in accordance with a specific embodiment of the present invention. In at least one embodiment, a separate instance of the Network Monitoring Procedure may be implemented at each switch (or selected switches) in the FC fabric. One function of the Network Monitoring Procedure is to monitor the FC fabric for changes in the network topology which may affect routing of traffic within the SAN/VSAN. If any change to a route or link is detected (302), the Network Monitoring Procedure may respond by taking appropriate action such as, for example, by implementing (304) a Table Update Procedure such as that illustrated, for example, in FIG. 4 of the drawings.

Figure 4:
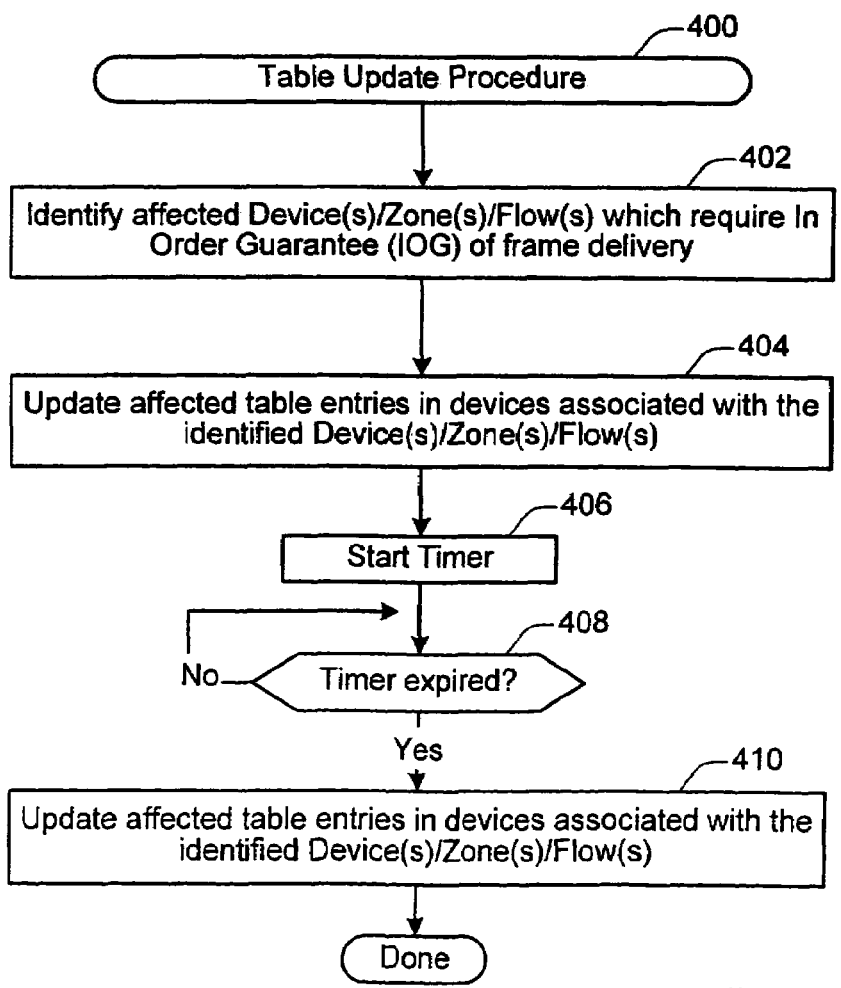
FIG. 4 shows a flow diagram of a Table Update Procedure 400 in accordance with a specific embodiment of the present invention.

FIG. 4 shows a flow diagram of a Table Update Procedure 400 in accordance with a specific embodiment of the present invention. In at least one embodiment, a separate instance of the Table Update Procedure may be implemented at each switch (or selected switches) in the FC fabric. Alternatively, in an alternate embodiment, the Table Update Procedure may be implemented at a remote device which is configured or designed to communicate with one or more switches in the FC fabric. In the example of FIG. 4, it is assumed that the Table Update Procedure has been implemented in response to the detection of a route or link change in the FC fabric. For purposes of illustration it is assumed in this example that the detected route change relates to link 205 (FIG. 2) temporarily going down. Such an event may be detected, for example, using routing protocol information (such as, for example, Fabric Shortest Path First (FSPF) Protocol information).

According to different embodiments of the present invention, different types of information (e.g., zoning information, flow information, device identity information, etc.) may be used as a classifier in order to provide a more granular way to define IOD parameters for various flows in a SAN/VSAN network, and to thereby avoid unwanted disruption to data traffic. For example, according to one embodiment, zoning information may be used as a classifier in order to specify in-order-delivery capabilities at the zone level of granularity. In another embodiment, flow information may be used as a classifier in order to specify in-order-delivery capabilities at the flow level of granularity. In a different embodiment, device identity information (e.g., SID, DID, etc.) may be used as a classifier in order to specify in-order-delivery capabilities at the device level of granularity. Each of these different embodiments may be implemented using the processes described, for example, in FIGS. 4 and 5 of the drawings. For purposes of simplification, each of these different embodiments may be collectively referred to using the phrase device(s)/zone(s)/flow(s).

Accordingly, depending upon the specific embodiment of the present invention which has been implemented, when a route or link change has been detected in the FC fabric, the Table Update Procedure may respond by identifying (402) affected device(s), zone(s), and/or flow(s) which have been flagged as requiring in-order-delivery of data traffic. In at least one implementation, an affected device/zone/flow may correspond to one which may be affected by the detected route/link change in the FC fabric. Additionally, in at least one embodiment, a zone or flow may be flagged as requiring in-order-delivery of data traffic if that zone or flow includes at least one associated device which is sensitive to the order in which frames are delivered.

For purposes of illustration, a specific embodiment of a zone-based in-order-delivery technique of the present invention will now be described by way of example with reference to FIG. 2 of the drawings. In this example, the zone attributes of the storage area network 200 may be used as a classifier in order to implement in-order-delivery of data traffic on a zone-by-zone basis.

In this example, it is assumed that device D1 is sensitive to the order in which frames are delivered, and that device D2 is not sensitive to the order in which frames are delivered. Additionally, in this example it is assumed that link 205 (FIG. 2) has temporarily going down. Accordingly, at 402, zones are identified which are affected by the failure of link 205, and which have been flagged as being sensitive to in-order-delivery of data traffic. The affected zones in this example may possibly include Zones A, B, and C. However, since Zone B does not include any member or device which is sensitive to the order in which frames are delivered, this zone is not included in the list of identified zones at 402. Accordingly, in this example, Zones A and C are identified at 402.

Figure 11:
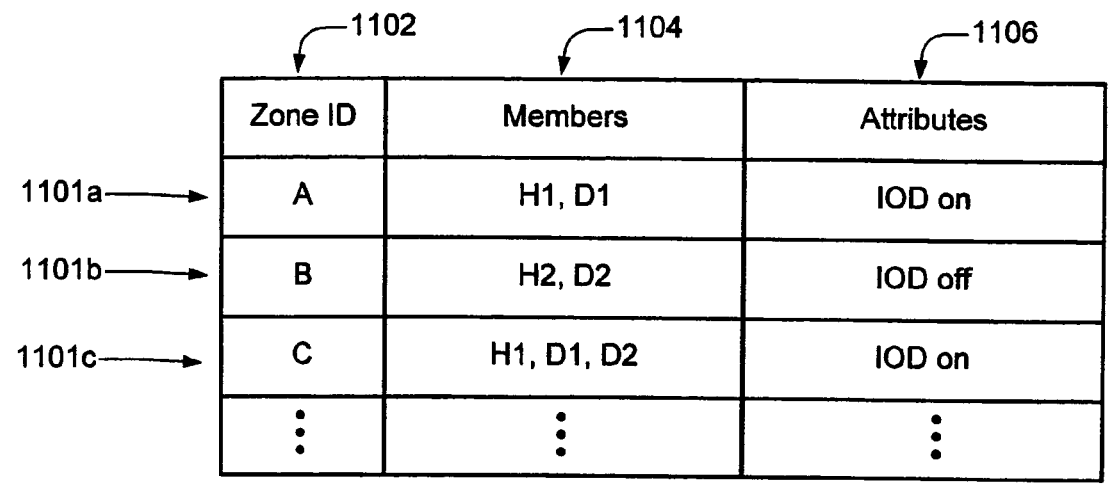

FIG. 11 shows a representation of a portion of a data structure 1100 (herein referred to as a Zone Attribute Table) which may be used for facilitating the zone-based in-order delivery technique of the present invention. In at least one embodiment, a separate instance of the data structure illustrated in FIG. 11 may reside in memory such as, for example, the local memory of one or more switches of the Fibre Channel fabric. As illustrated in the example of FIG. 11, Zone Attribute Table 1100 includes a plurality of entries 1101a-c. Each entry in the table includes information relating to a variety of different parameters such as, for example, zone ID information 1102, zone member information 1104, zone attribute information 1106, etc. For example, entry 1101a includes parameters and/or other information relating to Zone A (e.g., 202 of FIG. 2) such as, for example, the SAN devices (e.g., H1, D1) which are members of Zone A, attribute information associated with Zone A, etc. In a specific implementation, the attribute information 1106 may include one or more Zone Attribute Objects (e.g., Protocol, Broadcast Zone, Hard Zone, Vendor Specified, QoS, etc.) as defined, for example, in FC-GS-4 and FC-SW-3. Additionally, as illustrated in FIG. 11, the attribute information 1106 may also include in-order delivery configuration information relating to whether or not that particular zone (e.g., Zone A) includes device(s) which are sensitive to the order in which frames are delivered. For example, entry 1101a specifies that in-order delivery (IOD) is required for data traffic associated with Zone A; entry 1101b specifies that in-order delivery (IOD) is not required for data traffic associated with Zone B; entry 1101c specifies that in-order delivery (IOD) is required for data traffic associated with Zone C, etc.

It will be appreciated that, in alternate embodiments, specific flows and/or specific destination devices may be identified (e.g., at 402) which are affected by the failure of link 205, and which have been flagged as being sensitive to in-order-delivery of data traffic. For example, in one implementation where a flow-based in-order-delivery technique is used, the flows identified at 402 may include H1-D1 and H2-D1 since each of these flows is affected by the failure of link 205, and includes at least one device (e.g., D1) which is sensitive to in-order-delivery of data traffic. However, since flows H1-D2 and H2-D2 are not sensitive to in-order-delivery of data traffic, these flows will not be identified at 402. In an alternate implementation where a device ID-based in-order-delivery technique is used, the device(s) identified at 402 may include D1 since this device is affected by the failure of link 205, and is also sensitive to in-order-delivery of data traffic. However, since devices H1, H2, and D2 are not sensitive to in-order-delivery of data traffic, these devices will not be identified at 402.

Once the appropriate device(s)/zone(s)/flow(s) have been identified, affected table entries in the FC fabric devices (e.g., switches) associated with the identified device(s)/zone(s)/flow(s) may be updated (404) to reflect updated parameters for handling data traffic relating to the identified device(s)/zone(s)/flow(s). According to at least one implementation, the affected table entries may include entries associated with Access Control Tables and/or Forwarding Tables residing at one or more of the switches in the FC fabric. Additionally, in at least one implementation, the updated parameter information may include instructions for temporarily dropping frames (or other data traffic) associated with the identified device(s)/zone(s)/flow(s).

FIGS. 8-10 illustrate various types of information which may be stored in different access control/forwarding tables, according to different embodiments of the present invention. For example, FIG. 8 illustrates a specific embodiment of a portion of an access control table 800 which may be use for implementing a zone-based in-order-delivery mechanism of the present invention; FIG. 9 illustrates a specific embodiment of a portion of an access control table 900 which may be use for implementing a flow-based in-order-delivery mechanism of the present invention; and FIG. 10 illustrates a specific embodiment of a portion of an access control table 1000 which may be use for implementing a destination ID-based in-order-delivery mechanism of the present invention.

As illustrated in the example of FIG. 8, each entry in the Access Control Table 800 may include a plurality of fields such as, for example: a zone ID field 802 which includes information for identifying a particular zone in the FC fabric; a membership field 804 which includes information relating to members or devices associated with the zone ID; an action field 806 which includes information relating to an action or operation to be performed for handling data traffic associated with the zone ID; etc.

As illustrated in the example of FIG. 9, each entry in the Access Control Table 900 may include a plurality of fields such as, for example: a flow ID field 902 which includes information for identifying a particular flow in the FC fabric; a membership field 904 which includes information relating to members or devices associated with the flow ID; an action field 906 which includes information relating to an action or operation to be performed for handling data traffic associated with the flow ID; etc.

As illustrated in the example of FIG. 10, each entry in the Access Control Table 1000 may include a plurality of fields such as, for example: a device ID field 1002 which includes information relating to a particular destination device ID (e.g., DID) in the SAN; an action field 1006 which includes information relating to an action or operation to be performed for handling data traffic associated with the destination device ID; etc.

In the present example, it is noted that Zones A and C have been identified at 402. Accordingly, in one implementation, entry 801 (relating to Zone A) and entry 803 (relating to Zone C) of the Access Control Table 800 of FIG. 8 may be updated to include instructions for temporarily dropping frames (and/or other data traffic) associated with Zones A and C. Thus, for example, as shown in FIG. 8, information in the actions fields (806) associated with entries 801 and 803 are updated to "drop", indicating that frames associated with Zones A and C should be dropped. However, frames associated with Zone B may still be forwarded on to their final destination.

In an alternate implementation where a flow-based in-order-delivery technique is used, and flows H1-D1 and H2-D1 have been identified at 402, then entry 901 (relating to flow H1-D1) and entry 903 (relating to flow H2-D1) of the Access Control Table 900 of FIG. 9 may be updated to include instructions for temporarily dropping frames (and/or other data traffic) associated with flows HL-D1 and H2-D1. In a different implementation where a device ID-based in-order-delivery technique is used, and device D1 has been identified at 402, then entry 1001 (relating to device D1) of the Access Control Table 1000 of FIG. 10 may be updated to include instructions for temporarily dropping frames (and/or other data traffic) associated with device D1.

According to at least one embodiment, when a link or route change has been detected in the FC fabric, the switches of the FC fabric may be configured or designed to respond by temporarily dropping (e.g., for a temporary time period T) all frames associated with the identified device(s)/zone(s)/flow(s) which have been flagged as requiring in-order-delivery of data traffic. In one implementation, the length of the temporary time period (T) may be set to a value at least equal to the value of the maximum latency delay associated with the FC fabric, or the maximum latency delay associated with the route/link in which a change has been detected.

Figure 1:
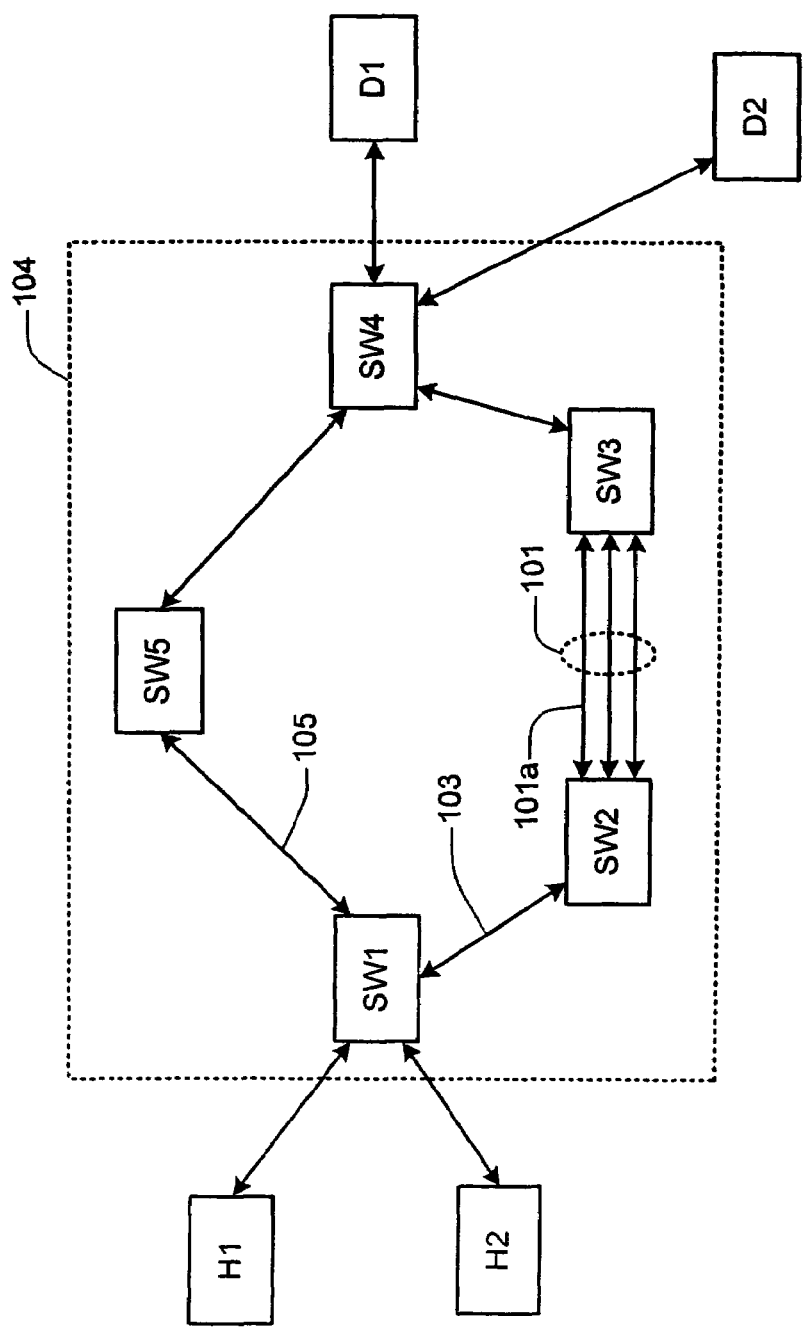
FIG. 1 shows a block diagram of a portion 100 of a Fibre Channel network.

For example, referring to FIG. 2, if link 203 were to go down, then it may be preferable to delay sending new packets thru link 205 for a temporary time period T sufficient to allow all previously sent packets on link 203 to reach their final destination. Thus, in one implementation, the temporary time period T may be set to a value equal to or greater than the fabric latency time (e.g., the maximum time a packet may take to travel from one end of the fabric to other end). This will help to ensure that all the previously sent packets are drained out of the network before new packets are injected. Alternatively, if link 101a (FIG. 1) were to go down, the temporary time period T may be set to a value equal to or greater than the switch latency value (e.g., a maximum time a packet may take to travel through a switch). This helps to ensure that all previously sent packets from a first switch have been processed by the adjacent switch before new packets are sent from the first switch.

In the embodiment of FIG. 4, a timer mechanism may be used for measuring the temporary time period T. Thus, for example, once the affected table entries in the FC fabric devices have been updated to temporarily drop frames (or other data traffic) associated with the identified device(s)/zone(s)/flow(s), the timer may be started (406). At the end of the time period T, when the timer has expired (408), the affected table entries in the FC fabric devices have were updated at 404 may again be updated (410) to restore normal handling of frames (or other data traffic) associated with the identified device(s)/zone(s)/flow(s). In at least one embodiment, the restoring of normal handling operations may include updating the affected table entries to cancel any "drop" actions which were inserted at 404 (such as, for example, by updating the "drop" parameters to "forward").

Figures 5, 6, 7:
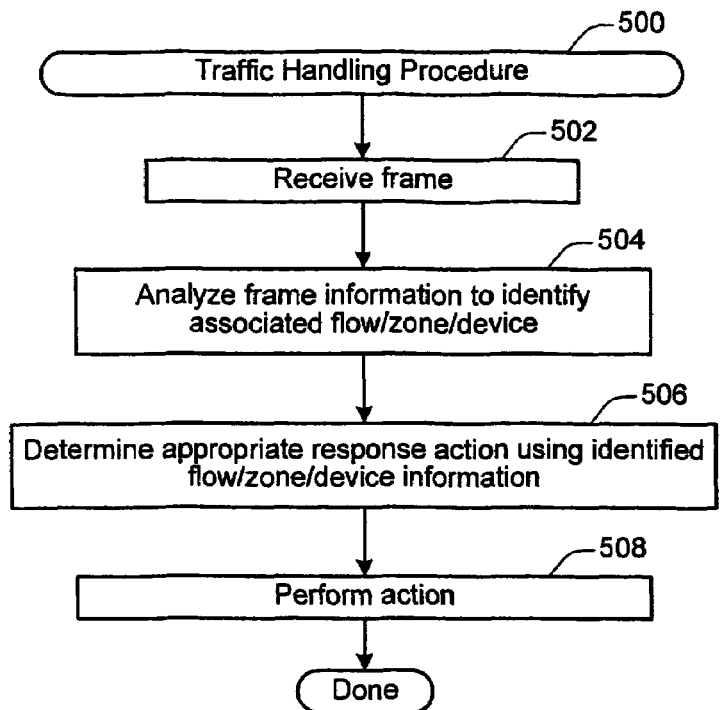
FIG. 5 shows a flow diagram of a Traffic Handling Procedure 500 in accordance with a specific embodiment of the present invention.
FIG. 6 shows an example of a portion of a Device Attribute Table 600 in accordance with a specific embodiment of the present invention.
FIG. 7 shows an example of a portion of a Domain Mapping Table 700 in accordance with a specific embodiment of the present invention.

FIG. 5 shows a flow diagram of a Traffic Handling Procedure 500 in accordance with a specific embodiment of the present invention. In at least one embodiment, a separate instance of the Traffic Handling Procedure may be implemented at each switch (or selected switches) in the FC fabric. According to different embodiments of the Traffic Handling Procedure, when a frame is received (502), information in the frame is analyzed (504) to identify the frame's associated flow, zone, and/or specified destination address. In at least one embodiment, such information may be obtained, for example, by analyzing information contained within the frame header. In a specific embodiment, the received frame may be classified in order to identify its associated flow, which, for example, may be expressed in terms of SID-DID. According to a specific embodiment, any conflicts in the zone identification for a particular flow (e.g., one flow belonging to multiple zones) may be resolved in a manner which results in the selection of the more conservative in-order-delivery configuration parameters.

Using the identified flow/zone/destination address information, an appropriate response or action may then be determined (506) and performed (508). According to a specific implementation, the response or action may be determined by referencing information stored in Access Control Table(s) and/or Forwarding Table(s) which, for example, may reside locally at each switch.

For example, in an embodiment where a zone-based in-order-delivery technique is implemented, the Access Control Table 800 of FIG. 8 may be used to determine the appropriate action for handling frames associated with Zones A, B, and C. According to the information specified in the Access Control Table 800, frames which are associated with Zone A or Zone C are to be dropped, while frames associated with Zone B are to be forwarded to their appropriate destination addresses.

In an alternate embodiment where a flow-based in-order-delivery technique is implemented, the Access Control Table 900 of FIG. 9 may be used to determine the appropriate action for handling frames associated with the various flows in the SAN. According to the information specified in the Access Control Table 900, frames which are associated with flows H1-D1 (e.g., SID1-DID1) and H2-D1 (e.g., SID2-DID1) are to be dropped, while frames associated with flows H1-D2 (e.g., SID1-DID2) and H2-D2 (e.g., SID2-DID2) are to be forwarded to their appropriate destination addresses.

In a different embodiment where a device ID-based in-order-delivery technique is implemented, the Access Control Table 1000 of FIG. 10 may be used to determine the appropriate action for handling frames associated with various devices in the SAN. According to the information specified in the Access Control Table 1000, frames which specify a destination address corresponding to device D1 are to be dropped, while frames specifying destination addresses of other devices in the SAN (e.g., D1, H1, H2, etc.) are to be forwarded to their appropriate destination addresses.

It will be appreciated that the zone-based in-order-delivery technique of the present invention provides a relatively simple way to specify in-order-delivery capabilities at the zone level of granularity. According to one embodiment, the zone-based in-order-delivery information may be included in information relating to Zone Attribute Objects, defined, for example, in FC-GS-4 and FC-SW-3. By using the zone as the classifier, the technique of the present invention provides a more granular way to define IOD parameters for various flows in a SAN/VSAN network, which in turn, may reduce the number of affected flows and avoid unwanted disruption to data traffic. Moreover, by configuring IOD for only the zones that have out-of-order sensitive devices, other devices may be exempted from the penalties (e.g., drops, disruptions, etc.) of enabling IOD. Similarly, it will be appreciated that the flow-based in-order-delivery technique of the present invention provides a relatively simple way to specify in-order-delivery capabilities at the flow level of granularity, and that the device ID-based in-order-delivery technique of the present invention provides a relatively simple way to specify in-order-delivery capabilities at the device level of granularity.

It will be appreciated that other embodiments of the present invention may utilize a combination of zone-based, flow-based and/or device ID-based in-order-delivery techniques. For example, in one implementation, a SAN may be adapted to allow users to configure zone-based in-order-delivery parameters (e.g., specifying which zones do/do not require in-order-delivery) via software. A separate hardware and/or software process may then use the zone-based in-order-delivery configuration parameters to automatically and dynamically generate flow-based in-order-delivery parameters for the flows associated with each of the identified zones. Alternatively, the separate hardware and/or software process may use the zone-based in-order-delivery configuration parameters to automatically and dynamically generate device ID-based in-order-delivery parameters for the devices associated with each of the identified zones. One of the benefits of such hybrid techniques is that it allows for more granular control of network configurations without increasing the burden on the user. For example, a user is able to specify in-order-delivery configurations at the zone level of granularity, which may then be used to automatically and dynamically generate in-order-delivery configurations at the flow and/or device levels of granularity.

One of the benefits of utilizing Zone Attribute Objects (such as those defined, for example, in the FC-GS-4 and FC-SW-3 standards) to specify in-order-delivery parameters as a zone attribute is that such an implementation is able to leverage the use of the existing zone distribution mechanisms to automatically propagate the in-order-delivery configurations across the FC fabric, thereby obviating the need to manually configure in-order-delivery parameters on each switch in the FC fabric, and obviating the need to provide new mechanisms to support distribution of in-order-delivery configurations in the fabric. Thus, in at least one implementation, the technique of the present invention provides a policy and mechanism for implementing zone based in-order-delivery granularity across a SAN using the zoning configuration and distribution mechanism. Such a technique also enhances the utility of zoning. Moreover, by configuring in-order-delivery parameters on a zone basis, network administrators are able to fine tune the network to make more effective use of the network bandwidth.

According to at least one embodiment, the technique of the present invention may also be used to distribute a per-VSAN in-order-delivery attribute across the FC fabric. In one implementation, the zoning-based in-order-delivery attribute may use the VSAN in-order-delivery attribute as the default in-order-delivery configuration, for example, in situations where the zoning-based attribute has not been set. In this way, a user or network administrator need not have to make use of this level of granularity, for example, in simple environment where such levels of granularity are not needed.

FIG. 6 shows an example of a portion of a Device Attribute Table 600 in accordance with a specific embodiment of the present invention. In at least one embodiment, a separate instance of the Device Attribute Table may be stored locally at each switch (or selected switches) in the FC fabric. Alternatively, in an alternate embodiment, the Device Attribute Table may reside at a remote device which is configured or designed to communicate with one or more switches in the FC fabric. In at least one implementation, information stored in the Device Attribute Table may be used to determine which the devices in the SAN are sensitive to the order in which frames are received. For example, as shown in FIG. 6, device D1 (device ID=DID1) is indicated to be sensitive to frame order delivery, whereas devices D2 (DID2), H1 (SID1), and H2 (SID2) are indicated not to be sensitive to frame order delivery.

FIG. 7 shows an example of a portion of a Domain Mapping Table 700 in accordance with a specific embodiment of the present invention. In at least one embodiment, a separate instance of the Domain Mapping Table may be stored locally at each switch (or selected switches) in the FC fabric. In at least one implementation, information stored in the Domain Mapping Table may be used to determine the destination domain associated with each device in the SAN. For example, as shown in FIG. 7, devices D1 (DID1) and D2 (DID2) are associated with the destination domain 4 (which, for example, is associated with switch SW4 of FIG. 2), and devices H1 (SID1) and H2 (SID2) are associated with the destination domain 1 (which, for example, is associated with switch SW1 of FIG. 2).

Figure 12:
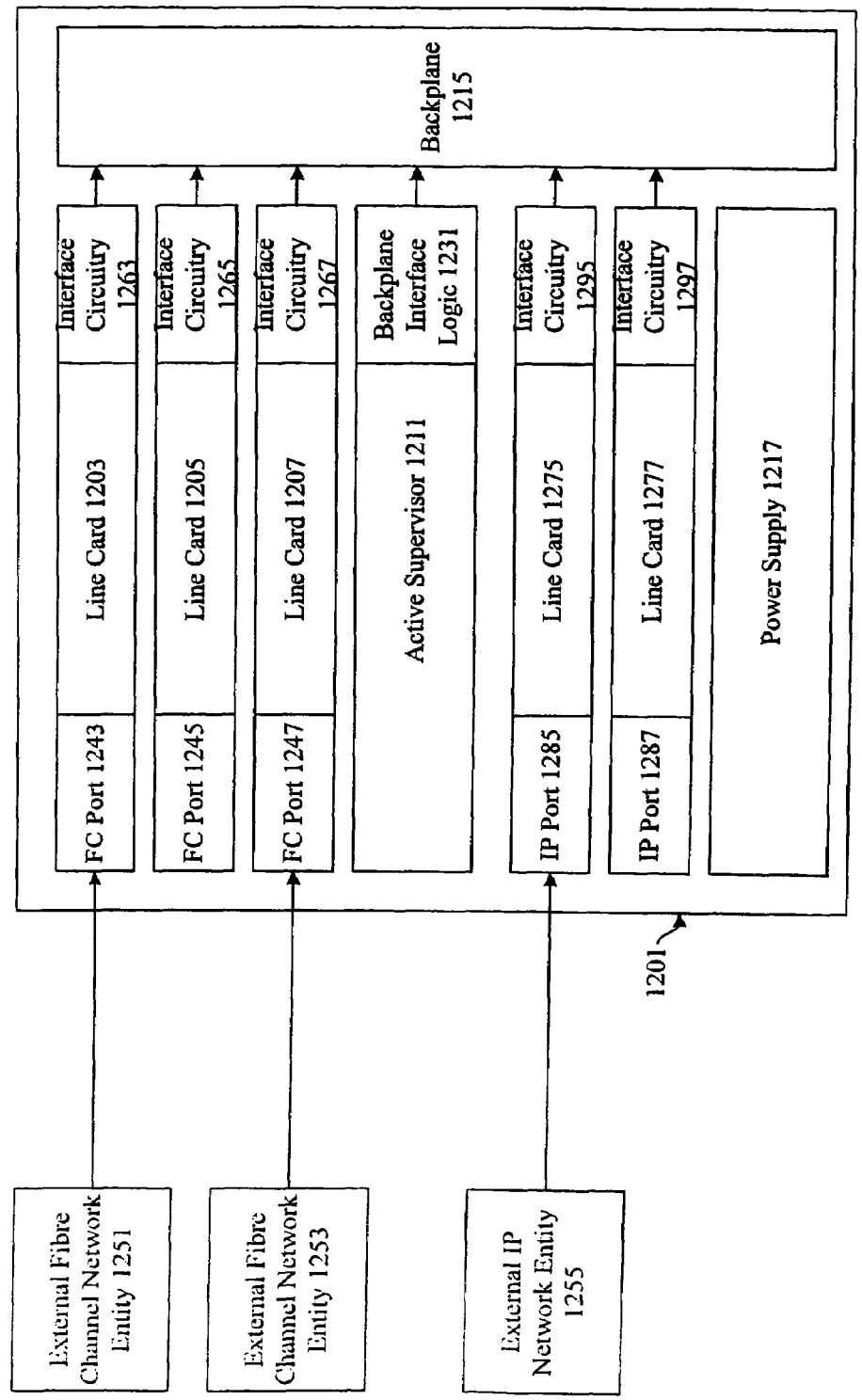
FIG. 12 is a diagrammatic representation of one example of a Fibre Channel switch that can be used to implement techniques of the present invention.

FIG. 12 is a diagrammatic representation of one example of a Fibre Channel switch that can be used to implement techniques of the present invention. Although one particular configuration will be described, it should be noted that a wide variety of switch and router configurations are available. The switch 1201 may include one or more supervisors 1211 and power supply 1217. According to various embodiments, the supervisor 1211 has its own processor, memory, and storage resources.

Line cards 1203, 1205, and 1207 can communicate with an active supervisor 1211 through interface circuitry 1263, 1265, and 1267 and the backplane 1215. According to various embodiments, each line card includes a plurality of ports that can act as either input ports or output ports for communication with external Fibre Channel network entities 1251 and 1253. The backplane 1215 can provide a communications channel for all traffic between line cards and supervisors. Individual line cards 1203 and 1207 can also be coupled to external Fibre Channel network entities 1251 and 1253 through Fibre Channel ports 1243 and 1247.

External Fibre Channel network entities 1251 and 1253 can be nodes such as other Fibre Channel switches, disks, RAIDS, tape libraries, or servers. The Fibre Channel switch can also include line cards 1275 and 1277 with IP ports 1285 and 1287. In one example, IP port 1285 is coupled to an external IP network entity 1255. The line cards 1275 and 1277 also have interfaces 1295 and 1297 to the backplane 1215.

It should be noted that the switch can support any number of line cards and supervisors. In the embodiment shown, only a single supervisor is connected to the backplane 1215 and the single supervisor communicates with many different line cards. The active supervisor 1211 may be configured or designed to run a plurality of applications such as routing, domain manager, system manager, and utility applications. The supervisor may include one or more processors coupled to interfaces for communicating with other entities.

According to one embodiment, the routing application is configured to provide credits to a sender upon recognizing that a packet has been forwarded to a next hop. A utility application can be configured to track the number of buffers and the number of credits used. A domain manager application can be used to assign domains in the Fibre Channel storage area network. Various supervisor applications may also be configured to provide functionality such as flow control, credit management, in-order-delivery, quality of service (QoS) functionality, etc. for various Fibre Channel protocol layers.

In addition, although an exemplary switch is described, the above-described embodiments may be implemented in a variety of network devices (e.g., servers) as well as in a variety of mediums. For instance, instructions and data for implementing the above-described invention may be stored on a disk drive, a hard drive, a floppy disk, a server computer, or a remotely networked computer. Accordingly, the present embodiments are to be considered as illustrative and not restrictive, and the invention is not to be limited to the details given herein, but may be modified within the scope and equivalents of the appended claims.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of network protocols and architectures. It is therefore intended that the invention be interpreted to include all variations and equivalents that fall within the true spirit and scope of the present invention.

Although several preferred embodiments of this invention have been described in detail herein with reference to the accompanying drawings, it is to be understood that the invention is not limited to these precise embodiments, and that various changes and modifications may be effected therein by one skilled in the art without departing from the scope of spirit of the invention as defined in the appended claims.

It is claimed:

1. A method for managing in-order-delivery of data traffic in a storage area network, the storage area network including at least one host device which is adapted to communicate with at least one storage device via a fibre channel fabric, the fibre channel fabric including at least one switch, the method comprising:
   detecting a change in at least one route in the fibre channel fabric;
   identifying a first portion of traffic flow in the network which is affected by the at least one route change, the first portion of traffic flow including a first device which is sensitive to an order in which data traffic is received, wherein the first device is associated with a first destination domain; and
   dropping frames associated with the first portion of traffic flow during a first temporary time period.

2. The method of claim 1 wherein the first portion of traffic flow includes at least one element selected from a group consisting of: a first zone in the network which is affected by the at least one route change; a first flow in the network which is affected by the at least one route change, and at least one device in the network which is affected by the at least one route change, the method further comprising:
   dropping frames associated with the first zone during the first temporary time period, if the first device is a member of the first zone;
   dropping frames associated with the first flow during the first temporary time period, if the first device is related to the first flow; and
   dropping frames associated with the first device during the first temporary time period, if the first device is affected by the at least one route change and is sensitive to an order in which data traffic is received.

3. The method of claim 1 further comprising:
   identifying a second portion of traffic flow in the network which is affected by the at least one route change, the second portion of traffic flow including a second device which is not sensitive to an order in which data traffic is received, wherein the second device is associated with the first destination domain; and
   forwarding frames associated with the second portion of traffic flow during the first temporary time period.

4. The method of claim 1 wherein the first portion of traffic flow includes at least one element selected from a group consisting of: a first zone in the network which is affected by the at least one route change; a first flow in the network which is affected by the at least one route change, and at least one device in the network which is affected by the at least one route change, the method further comprising:
   identifying a second portion of traffic flow in the network which is affected by the at least one route change, the second portion of traffic flow including a second device which is not sensitive to an order in which data traffic is received, wherein the second device is associated with the first destination domain, and wherein the second portion of traffic flow includes at least one element selected from a second group consisting of: a second zone in the network which is affected by the at least one route change; a second flow in the network which is affected by the at least one route change, and at least one device in the network which is affected by the at least one route change;
   dropping frames associated with the first zone during the first temporary time period, if the first device is a member of the first zone;
   dropping frames associated with the first flow during the first temporary time period, if the first device is related to the first flow;
   dropping frames associated with the first device during the first temporary time period, if the first device is affected by the at least one route change and is sensitive to an order in which data traffic is received;
   forwarding frames associated with the second zone during the first temporary time period, if the second device is a member of the second zone;
   forwarding frames associated with the second flow during the first temporary time period, if the second device is related to the second flow; and
   forwarding frames associated with the second device during the first temporary time period, if the second device is affected by the at least one route change and is not sensitive to an order in which data traffic is received.

5. The method of claim 1 further comprising updating access control information at a first switch in the fibre channel fabric to include updated instructions to drop frames associated with the identified first portion of traffic flow.

6. The method of claim 1 wherein the first portion of traffic flow includes at least one element selected from a group consisting of: a first zone in the network which is affected by the at least one route change; a first flow in the network which is affected by the at least one route change, and at least one device in the network which is affected by the at least one route change, the method further comprising:
   updating access control information at a first switch in the fibre channel fabric to include updated instructions to drop frames associated with the first zone during the first temporary time period, if the first device is a member of the first zone;
   updating access control information at a first switch in the fibre channel fabric to include updated instructions to drop frames associated with the first flow during the first temporary time period, if the first device is related to the first flow; and
   updating access control information at a first switch in the fibre channel fabric to include updated instructions to drop frames associated with the first device during the first temporary time period, if the first device is affected by the at least one route change and is sensitive to an order in which data traffic is received.

7. The method of claim 1 further comprising:
   receiving a first frame, the first frame including header information including a source device identity and a destination device identity;
   dropping the first frame if it is determined: that the first frame is associated with a first zone in the network which is affected by the at least one route change, and that the first device is a member of the first zone;

dropping the first frame if it is determined: that the first frame is associated with a first flow in the network which is affected by the at least one route change, and that the first device is related to the first flow; and dropping the first frame if it is determined: that the first frame is associated with the first device, that the first device is affected by the at least one route change, and that the first device is sensitive to an order in which data traffic is received.

8. The method of claim 1 further comprising:

receiving a first frame, the first frame including header information including a source device identity and a destination device identity;

dropping the first frame if it is determined: that the first frame is associated with a first zone in the network which is affected by the at least one route change, and that the first device is a member of the first zone;

dropping the first frame if it is determined: that the first frame is associated with a first flow in the network which is affected by the at least one route change, and that the first device is related to the first flow;

dropping the first frame if it is determined: that the first frame is associated with the first device, that the first device is affected by the at least one route change, and that the first device is sensitive to an order in which data traffic is received;

forwarding the first frame if it is determined: that the first frame is associated with a second zone in the network which is affected by the at least one route change, and that the first device is a member of the second zone;

forwarding the first frame if it is determined: that the first frame is associated with a second flow in the network which is affected by the at least one route change, and that the first device is related to the second flow;

forwarding the first frame if it is determined: that the first frame is associated with a second device which is affected by the at least one route change, and that the second device is not sensitive to an order in which data traffic is received.

9. The method of claim 1 further comprising:

receiving a first frame, the first frame including header information including a first source device identity and a first destination device identity;

detecting that the first frame is associated with the first portion of traffic flow;

dropping the first frame;

identifying a second portion of traffic flow in the network which is affected by the at least one route change, the second portion of traffic flow including a second device which is not sensitive to an order in which data traffic is received, wherein the second device is associated with the first destination domain;

receiving a second frame, the second frame including header information including a second source device identity and a second destination device identity;

detecting that the second frame is associated with the second portion of traffic flow; and forwarding the second frame towards the second destination device.

10. The method of claim 1 further comprising:

configuring a first switch in the fibre channel fabric to implement the method of claim 1.

11. The method of claim 1 further comprising:

using an automated mechanism to propagate in-order-delivery configuration information across the fibre channel fabric.

12. The method of claim 1 further comprising:

using an automated mechanism to propagate in-order-delivery configuration information across the fibre channel fabric;

wherein the in-order-delivery configuration information is embedded within Zone Attribute information which is automatically distributed to switches across the fibre channel fabric.

13. The method of claim 1 further comprising:

accessing in-order-delivery configuration information stored within a first field of a Zone Attribute Object; and using the in-order-delivery configuration information to determine whether the first portion of traffic flow includes at least one device which is sensitive to an order in which frames are received.

14. A system for managing in-order-delivery of data traffic in a storage area network, the storage area network including at least one host device which is adapted to communicate with at least one storage device via a fibre channel fabric, the fibre channel fabric including at least one switch, the system comprising:

at least one processor;

at least one interface operable to provide a communication link to at least one network device; and memory;

the system being operable to:

detect a change in at least one route in the fibre channel fabric;

identify a first portion of traffic flow in the network which is affected by the at least one route change, the first portion of traffic flow including a first device which is sensitive to an order in which data traffic is received, wherein the first device is associated with a first destination domain; and drop frames associated with the first portion of traffic flow during a first temporary time period.

15. The system of claim 14 wherein the first portion of traffic flow includes at least one element selected from a group consisting of: a first zone in the network which is affected by the at least one route change; a first flow in the network which is affected by the at least one route change, and at least one device in the network which is affected by the at least one route change, the system being further operable to:

drop frames associated with the first zone during the first temporary time period, if the first device is a member of the first zone;

drop frames associated with the first flow during the first temporary time period, if the first device is related to the first flow; and drop frames associated with the first device during the first temporary time period, if the first device is affected by the at least one route change and is sensitive to an order in which data traffic is received.

16. The system of claim 14 being further operable to:

identify a second portion of traffic flow in the network which is affected by the at least one route change, the second portion of traffic flow including a second device which is not sensitive to an order in which data traffic is received, wherein the second device is associated with the first destination domain; and forward frames associated with the second portion of traffic flow during the first temporary time period.

17. The system of claim 14 wherein the first portion of traffic flow includes at least one element selected from a group consisting of: a first zone in the network which is affected by the at least one route change; a first flow in the network which is affected by the at least one route change, and at least one device in the network which is affected by the at least one route change, the system being further operable to:

identify a second portion of traffic flow in the network which is affected by the at least one route change, the second portion of traffic flow including a second device which is not sensitive to an order in which data traffic is received, wherein the second device is associated with the first destination domain, and wherein the second portion of traffic flow includes at least one element selected from a second group consisting of: a second zone in the network which is affected by the at least one route change; a second flow in the network which is affected by the at least one route change, and at least one device in the network which is affected by the at least one route change;

drop frames associated with the first zone during the first temporary time period, if the first device is a member of the first zone;

drop frames associated with the first flow during the first temporary time period, if the first device is related to the first flow;

drop frames associated with the first device during the first temporary time period, if the first device is affected by the at least one route change and is sensitive to an order in which data traffic is received;

forward frames associated with the second zone during the first temporary time period, if the second device is a member of the second zone;

forward frames associated with the second flow during the first temporary time period, if the second device is related to the second flow; and forward frames associated with the second device during the first temporary time period, if the second device is affected by the at least one route change and is not sensitive to an order in which data traffic is received.

18. The system of claim 14 being further operable to:

update access control information at a first switch in the fibre channel fabric to include updated instructions to drop frames associated with the identified first portion of traffic flow.

19. The system of claim 14 wherein the first portion of traffic flow includes at least one element selected from a group consisting of: a first zone in the network which is affected by the at least one route change; a first flow in the network which is affected by the at least one route change, and at least one device in the network which is affected by the at least one route change, the system being further operable to:

update access control information at a first switch in the fibre channel fabric to include updated instructions to drop frames associated with the first zone during the first temporary time period, if the first device is a member of the first zone;

update access control information at a first switch in the fibre channel fabric to include updated instructions to drop frames associated with the first flow during the first temporary time period, if the first device is related to the first flow; and update access control information at a first switch in the fibre channel fabric to include updated instructions to drop frames associated with the first device during the first temporary time period, if the first device is affected by the at least one route change and is sensitive to an order in which data traffic is received.

20. The system of claim 14 being further operable to:

receive a first frame, the first frame including header information including a source device identity and a destination device identity;

drop the first frame if it is determined: that the first frame is associated with a first zone in the network which is affected by the at least one route change, and that the first device is a member of the first zone;

drop the first frame if it is determined: that the first frame is associated with a first flow in the network which is affected by the at least one route change, and that the first device is related to the first flow;

drop the first frame if it is determined: that the first frame is associated with the first device, that the first device is affected by the at least one route change, and that the first device is sensitive to an order in which data traffic is received.

21. The system of claim 14 being further operable to:

receive a first frame, the first frame including header information including a source device identity and a destination device identity;

drop the first frame if it is determined: that the first frame is associated with a first zone in the network which is affected by the at least one route change, and that the first device is a member of the first zone;

drop the first frame if it is determined: that the first frame is associated with a first flow in the network which is affected by the at least one route change, and that the first device is related to the first flow;

drop the first frame if it is determined: that the first frame is associated with the first device, that the first device is affected by the at least one route change, and that the first device is sensitive to an order in which data traffic is received;

forward the first frame if it is determined: that the first frame is associated with a second zone in the network which is affected by the at least one route change, and that the first device is a member of the second zone;

forward the first frame if it is determined: that the first frame is associated with a second flow in the network which is affected by the at least one route change, and that the first device is related to the second flow;

forward the first frame if it is determined: that the first frame is associated with a second device which is affected by the at least one route change, and that the second device is not sensitive to an order in which data traffic is received.

22. The system of claim 14 being further operable to:

receive a first frame, the first frame including header information including a first source device identity and a first destination device identity;

detect that the first frame is associated with the first portion of traffic flow;

drop the first frame;

identify a second portion of traffic flow in the network which is affected by the at least one route change, the second portion of traffic flow including a second device which is not sensitive to an order in which data traffic is received, wherein the second device is associated with the first destination domain;

receive a second frame, the second frame including header information including a second source device identity and a second destination device identity;

detect that the second frame is associated with the second portion of traffic flow; and forward the second frame towards the second destination device.

23. The system of claim 14 being further operable to:

use an automated mechanism to propagate in-order-delivery configuration information across the fibre channel fabric.

24. The system of claim 14 being further operable to:

use an automated mechanism to propagate in-order-delivery configuration information across the fibre channel fabric;

wherein the in-order-delivery configuration information is embedded within Zone Attribute information which is automatically distributed to switches across the fibre channel fabric.

25. The system of claim 14 being further operable to:

accessing in-order-delivery configuration information stored within a first field of a Zone Attribute Object; and use the in-order-delivery configuration information to determine whether the first portion of traffic flow includes at least one device which is sensitive to an order in which frames are received.

26. A system for managing in-order-delivery of data traffic in a storage area network, the storage area network including at least one host device which is adapted to communicate with at least one storage device via a fibre channel fabric, the fibre channel fabric including at least one switch, the system comprising:

at least one processor;

memory;

means for detecting a change in at least one route in the fibre channel fabric;

means for identifying a first portion of traffic flow in the network which is affected by the at least one route change, the first portion of traffic flow including a first device which is sensitive to an order in which data traffic is received, wherein the first device is associated with a first destination domain, wherein the first portion of traffic flow includes at least one element selected from a group consisting of: a first zone in the network which is affected by the at least one route change; a first flow in the network which is affected by the at least one route change, and at least one device in the network which is affected by the at least one route change;

means for dropping frames associated with the first portion of traffic flow during a first temporary time period;

means for dropping frames associated with the first zone during the first temporary time period, if the first device is a member of the first zone;

means for dropping frames associated with the first flow during the first temporary time period, if the first device is related to the first flow; and means for dropping frames associated with the first device during the first temporary time period, if the first device is affected by the at least one route change and is sensitive to an order in which data traffic is received.

\* \* \* \* \*

UNITED STATES PATENT AND TRADEMARK OFFICE
CERTIFICATE OF CORRECTION

PATENT NO. : 7,647,434 B2
APPLICATION NO. : 11/134742
DATED : January 12, 2010
INVENTOR(S) : Cheethirala et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1082 days.

Signed and Sealed this

Twenty-eighth Day of December, 2010

David J. Kappos
*Director of the United States Patent and Trademark Office*